United States Patent [19]

Sasaki et al.

[11] Patent Number: 4,923,912

[45] Date of Patent: May 8, 1990

[54] EPOXY RESIN COMPOSITION

[75] Inventors: Yukio Sasaki, Roslyn, N.Y.; Takayuki Watanabe, Matsudo, Japan; Hiroshi Takamiya, Kamisu, Japan; Kazuo Watanabe, Osaka, Japan; Yoko Yamazaki, Nagareyama, Japan

[73] Assignee: Mitsubishi Gas Chemical Company, Inc., Tokyo, Japan

[21] Appl. No.: 221,915

[22] Filed: Jul. 20, 1988

[30] Foreign Application Priority Data

Jul. 22, 1987 [JP] Japan ............................... 62-181235

[51] Int. Cl.$^5$ ..................... C08G 59/40; C08G 77/38
[52] U.S. Cl. ................................. 523/466; 523/435; 525/476; 525/482; 525/485; 525/486; 525/487; 528/21; 528/23; 528/27
[58] Field of Search .............. 525/482, 476, 485, 486, 525/487; 528/21, 23, 27; 523/466, 435

[56] References Cited

U.S. PATENT DOCUMENTS

| | | | |
|---|---|---|---|
| 4,022,753 | 5/1977 | Lohse et al. | 525/487 X |
| 4,604,435 | 8/1986 | Koshii et al. | 525/476 |
| 4,657,986 | 4/1987 | Isayama et al. | 525/476 X |
| 4,720,515 | 1/1988 | Iji et al. | 525/476 X |

Primary Examiner—Earl Nielsen
Attorney, Agent, or Firm—Wenderoth, Lind & Ponack

[57] ABSTRACT

An epoxy resin composition consisting essentially of
(A) an epoxy resin,
(B) a curing agent,
(C) a curing promoter,
(D) an organic silicon compound having at least one phenolic hydroxyl group per molecule, and
(E) a filler.

11 Claims, No Drawings

EPOXY RESIN COMPOSITION

This invention relates to an epoxy resin composition having excellent thermal stability, moisture resistance and low stress characteristics. More specifically, it relates to an epoxy resin composition having improved low stress characteristics while retaining the good property balance of a conventional epoxy resin. The epoxy resin of this invention is particularly suitable as an encapsulating material for electronic and electrical parts.

Epoxy resins have been used extensively in various fields. In particular, most of encapsulating materials for electronic and electrical component parts are composed of epoxy resin compositions, and these resin compositions are important as encapsulating materials for semiconductor elements.

However, the use of conventional epoxy resin compositions as the encapsulating materials gives rise to a problem in that troubles are caused by stresses which occur owing to the shrinkage of the resin composition upon curing and to the difference in the coefficient of linear expansion between the encapsulating material and semiconductor chips or a metallic frame. Since these stresses will change the characteristic of the semiconductor elements and at times cause cracking of the chips, it has been strongly desired to lower stresses in the encapsulating epoxy resin compositions particularly in IC and LSI whose size has recently increased.

Some improvements to be described below have previously been proposed for lowering the stresses of the epoxy resin compositions.

(1) Japanese Laid-Open Patent Publication No. 94426/1985

This patent document describes an encapsulating resin molding material comprising a mixture of expoxy resin with a modified silicone compound having an amino group as a reactive group such as an aminosilicone intermediate, and the addition of the modified silicone compound leads to an improvement in the moldability, moisture resistance and low stress characteristics of the epoxy resin.

(2) Japanese Laid-Open Patent Publichation No. 50324/1987

This patent document describes that the moisture resistance and thermal resistance of an epoxy resin are improved by blending the epoxy resin with a product obtained by reacting a compound having at least two phenolic hydroxyl groups per molecule, such as bisphenol A or bisphenol F phenol novalak resin, with a silicone compound having a functional group capable of reacting with the phenolic hydroxyl groups (such as an epoxy group-containing silicone compound).

(3) Japanese Laid-Open Patent Publication No. 184517/1985

This patent document described an epoxy resin composition of improved mositure resistance and low stress characteristics for use in encapsulating semiconductors, which is prepared by using a silicone compound containing an epoxy group in both its terminals or its side chain with and in whcih a curing agent for the epoxy resin has been preliminarily reacted and dispersed.

(4) Japanese Laid-Open Patent Publication No. 136860/1987

This patent document discloses an encapsulating material for semiconductor elements which comprises an epoxy resin modified with a silicone compound containing an amino group or a carboxyl group and a phenolic resin modified with a silicone compound containing an epoxy group or an amino group and has improved moisture resistance and soldering resistance after moisture absorption.

The low stress characteristics of the epoxy resin composition can be improved by using an epoxy resin simply mixed, or preliminarily modified, with the silicone compound having a reactive group such as an amino or carboxyl group described in (1) and (4) above, but the moisture resistance and thermal resistance of the resulting epoxy resin composition are unsatisfactory. Since the silicone compound having an amino group or a carboxyl group is hydrophilic, the resulting epoxy resin has poor moisture resistance. Nor is the thermal resistance of the resulting epoxy resin composition satisfactory.

An epoxy resin composition having some degree of low stress characteristics can be obtained by simply mixing an epoxy resin with the silicone compound having a reactive group such as an epoxy group or using a phenolic resin preliminarily modified with the silicone compound as described in (2), (3) and (4). If the silicone compound is incorporated in a high concentration in an attempt to obtain satisfactory low stresses, the balance of the entire resin composition will be destroyed, and this rather results in impairing its moisture resistance and thermal resistance.

It is an object of this invention therefore to provide an epoxy resin composition having excellent thermal resistance, moisture resistance and low stress characteristics.

Another object of this invention is to provide an epoxy resin composition suitable as an encapsulating material for electronic and electrical parts.

Still another object of this invention is to provide an epoxy resin composition which can give encapsulated articles having high reliability.

A further object of this invention is to provide an epoxy resin composition which is industrially valuable as an encapsulating material.

Other objects of this invention will become apparent from the present invention.

According to this invention, the foregoing objects are achieved by an epoxy resin composition consisting essentially of (A) an epoxy resin,
(B) a curing agent,
(C) a curing promoter,
(D) an organic silicon compound having at least one phenolic hydroxyl group per molecule, and
(E) a filler.

The epoxy resin composition of this invention will be described below in more detail.

The epoxy resin (A) used in this invention may be any of those which contain at least two epoxy groups per molecule and are used for producing conventional epoxy resin compositions. Novolak-type epoxy resins, bisphenol-type epoxy resins and biphenyl-type epoxy resins are suitable for use as an encapsulating agent. These epoxy resins may be used singly or in combination.

Specific examples of the novolak-type epoxy resins are phenol novolack epoxy resins, phenol novolak epoxy resin and xylenol novolak epoxy resin. Examples of the bisphenol-type epoxy resins are bisphenol A epoxy resin, bisphenol F epoxy resin and bisphenol S epoxy resin. Examples of the biphenyl-type epoxy resins are the reaction products of various bishydroxybiphenyl compounds and epihalohydrins such as epichlorohydrin and epibromohydrin, specifically 4,4'-bis(2,3-epoxypropoxy)biphenyl, 4,4'-bis(2,3-epoxypropoxy)-3,3',5,5'-tetramethylbiphenyl, and 4,4'-bis(2,3-epoxypropoxy)-3,3',5,5'-tetramethyl-2-chlorobiphenyl.

These epoxy resins in whcih at least one alkyl group or at least one halogen atom such as bromine or chlorine is substituted in the molecule, particularly in the benzene rings constituting the epoxy resins may also be used so long as they do not impair the objects of the invention.

The curing agent (B) used in the composition of this invention may be any of those curing agents which are generally used for epoxy resins. It may be, for example, a difunctional or higher compound having functional groups such as amino, acid anhydride, hydroxyl, carboxyl and mercapto groups. Examples are amines, acid anhydrides and phenolic resins. For preparation of encapsulating materials, phenolic resins, particularly novolak-type phenolic resins, are preferred. Their structures and molecular weights are not particularly limited so long as they containing at least two hydroxyl groups per molecule. Specific preferred examples of the novolak-type phenolic resins are phenol novolak, cresol novolak and xylenol novolak. They may be substituted by at least one lower alkyl group or at least one halogen atom such as bromine or chlorine in its molecules, particularly in the benzene skeleton.

Desirably, the curing agent (B) is used in such an amount that the ratio of the epoxy group equivalent of the epoxy resin (A) to the functional group equivalent of the curing agent (B) is from 0.7/1 to 1.3/1, preferably from 0.9/1 to 1.1/1. If the proportion of the curing agent (B) is outside the specified range, the mechanical properties and moisture resistance of shaped articles prepared from the resulting epoxy resin composition will be undesirably deteriorated.

the curing promoter (C) used in the epoxy resin composition of this invention may be any of ordinary curing promoters used for epoxy resins, and may include, for example, imidazoles, organic phosphines, phosphonium salts, amines, cycloamidines and boron complexes. For preparation of encapsulating materials, it is preferred to use imidazoles (C-1), organic phosphines (C-2), amines (C-3) and cycloamidines (C-4) as the curing promoter. Specific examples of the imidazoles (C-1) include imidazole, 2-methylimidazole, 2-ethyl-4-methylimidazole, 2-phenylimidazole, 2-undecylimidazole, 2-phenyl-4-methyl-5-hydroxymethylimidazole and 1-cyanoethyl-2-phenylimidazole. Specific examples of the organic phosphines (C-2) include triphenylphosphine, triethylphosphine, tri-n-propylphosphine, tri-n-butylphosphine, tri-n-hexylphosphine, tri-n-octylphosphine and tris-2-cyanoethylphosphine. Specific examples of the amines (C-3) include triethylamine, ethylenediamine, piperazine, piperidine, morpholine, 2,4,6-tris(dimethylaminomethyl)phenol, m-phenylenediamine and 4,4'-diaminodiphenylmethane. Examples of the cycloamidines (C-4) include 1,5-diazabicyclo[3,4,0]nonene-5, 1,5-diazabicyclo[5,4,0]undecene-7 and 6-dibutylamino-1,8-diazabicyclo[5,4,0]undecene-7.

The preferred amount of the curing promoter (C) to be incorporated is 0.01 to 10 parts by weight, more preferably 0.1 to 5 parts by weight, per 100 parts by weight of the epoxy resin. If the amount of the curing promoter (C) is below the specified lower limit, no sufficient curing speed can be obtained. If it is larger than the specified upper limit, the moisture resistance of the resulting composition tends to be deteriorated.

The organic silicon compound (D) used in this invention has at least one phenolic hydroxyl group per molecule. The organic silicon compound (D) may be solid of liquid at room temperature, preferably liquid.

Especially preferred examples of the organic silicon compound (D) are compounds of the following general formula [I]

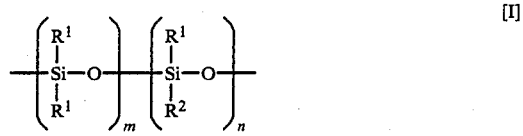

in which $R^1$'s are identical or different and each represents a hydrocarbon group selected from the class consisting of $C_1$–$C_3$ alkyl groups, $C_2$–$C_4$ alkenyl groups, $C_6$–$C_{12}$ aryl groups, $C_3$–$C_{10}$ cycloalkyl groups and $C_7$–$C_{12}$ aralkyl groups, the hydrocarbon group being optionally substituted by 1 to 6 halogen atoms; $R^2$ represents a group of the general formula

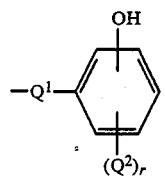

where $Q^1$ is a group of the general formula $-(-O-)_p-(-C_qH_{2q}-)$, p is 0 or 1 and q is an integer of 1 to 3, with the proviso that $Q^1$ may be bonded to the benzene ring at either end, and $Q^2$ represents a hydrogen atom, a halogen atom, a $C_1$–$C_3$ alkyl group, a $C_1$–$C_3$ alkoxy group, a $C_1$–$C_3$ haloalky group or a $C_1$–$C_3$ haloalkoxy group, and r is 1 or 2; m and n represent the numbers of the two types of siloxane moieties contained in the organic silicon compound, and m is 0 or an integer of 1 or more, n is an integer of 1 or more, and the total of m and n is 3 to 250; and each of the two ends is $R^1$ or $R^2$, and the type of each end group and the number represented by n are selected from the above definitions so that formula [I] contains at least one $R^2$ group.

In general formula [I], $R^1$'s may be identical or different, and each represents a hydrocarbon group selected from the class consisting of $C_1$–$C_3$ alkyl groups such as methyl, ethyl or propyl, $C_2$–$C_4$ alkenyl groups such as vinyl or allyl, $C_6$–$C_{12}$ aryl groups such as phenyl, $C_3$–$C_{10}$ cycloalkyl groups such as cyclohexyl or cyclooctyl and $C_7$–$C_{12}$ aralkyl groups such as benzyl or phenethyl. This hydrocarbon group may be substituted by 1 to 6, preferably 1 to 3, halogen atoms such as chlorine, bromine, iodine or fluorine atoms. Preferably, $R^1$ is the $C_1$–$C_3$ alkyl group.

$R^2$ represents a group of the formula

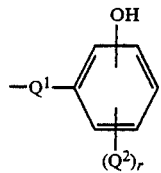

$Q^1$ is a group of the general formula $-(O)_p-(C_qH_{2q})-$ or a group resulting from reversing the above formula in the right-left direction, in which p is 0 or 1 and q is an integer of 1 to 3. Specific examples of $Q^1$ is methylene, ethylene, propylene, methylenoxy, ethylenoxy, propylenoxy, oxymethylene, oxyethylene and oxypropylene groups. $Q^2$ represents a hydrogen atom, a halogen atom such as chlorine, bromine, iodine or fluorine, a $C_1-C_{13}$ alkoxy group such as methoxy, ethoxy or propoxy, or a $C_1-C_3$ alkyl or alkoxy group substituted by 1 to 3 halogen atoms. r represents 1 or 2.

m and n represent the numbers of the two types of siloxane units contained in the organic silicon compound (D), and these units may be bonded in any desired sequence. m is 0 or more, and n is 1 or more. The total of m and n is 3 to 250, preferably 10 to 200.

In general formula [I], each of the terminal groups is $R^1$ or $R^2$. The type of the terminal groups or the number represented by n in general formula [I] are selected from the above definition so that general formula [I] contains at least on $R^2$ group, preferably at least two $R^2$ groups. Especially preferably, one or both terminal groups are $R^2$ groups.

There is no particular limitation on the method of producing the organic silicon compound represented by general formula [I]. For example, it may be produced by addition reaction between a hydrogenated silicone of general formula [I'] and a phenol compound substituted by a $C_2-C_3$ alkenyl group in the presence of a platinum group catalyst.

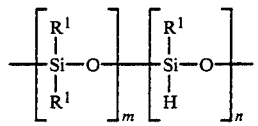

[I']

In general formula [I'], $R^1$, m and n are as defined with regard to formula [I], and the two terminals are $R^1$ or a hydrogen atom. The type of the two terminal groups and the number represented by n are selected from the above definitions so that the general formula [I'] includes at least one hydrogen atom, preferably at least two hydrogen atoms, bonded to silicon.

Examples of the phenolic compound substituted by a $C_2-C_3$ alkenyl group are 2-allylphenol, 4-allylphenol, 4-methoxy-2-allylphenol, 2-methoxy-4-allylphenol, hydroxystyrene, and allyl(hydroxyphenyl)ether.

The organic silicon compound (D) may be added together when mixing other components constituting the epoxy resin composition. Most preferably, it is mixed and dispersed with and in the epoxy resin (A) in advance. Specifically, it is preferred to add the organic silicon compound (D) to the melted epoxy resin (A), disperse it fully in the epoxy resin (A), and then cool and pulverize the mixture. In this case, it is preferred to react the phenolic hydroxyl group in the organic silicon compound (D) with the epoxy groups of the epoxy resin (A). To promote this reaction, the same compound as the curing promoter (C) is desirably added.

The amount of the organic silicon compound (D) is preferably 1 to 100 parts by weight, more preferably 3 to 60 parts by weight, per 100 parts by weight of the epoxy resin (A) and the curing agent (B) combined. If the amount of the organic silicon compound (D) is less than 1 part by weight, the desired effect of improving low stress characteristics is small and the composition is of no practical value. If, on the other hand, it exceeds 100 parts by weight, the characteristics of the epoxy resin composition will be lost, and the mechanical strength of the resulting composition will be reduced.

Any commonly known filler having reinforcing property may be used, without particular limitation, as the filler (E) used in the epoxy resin composition of the invention, and can be selected according to the use and purpose of the final resin composition.

Examples includes inorganic fillers such as silica, talc, mica, clay, kaolin, alumina, asbestos, glass balloons, calcium carbonate, aluminum hydroxide, titanium oxide, iron oxide glass fibers and zinc flower and organic fillers such as carbon fibers, cured phenolic resin powders and organic fiber. These fillers may be used singly or in combination. For encapsulation purposes, silica is suitably used. Crystalline silica and amorphous silica powders are preferred. The amount of the filler (E) to be incorporated is 50 to 1000 parts by weight, preferably 100 to 500 parts by weight, per 100 parts by weight of the epoxy resin (A), the curing agent (B) and the polyphenylene ether resin (D) combined. If its amount exceeds 1000 parts by weight, the filler is difficult to disperse and moreover, cause a deterioration in moldability and cracking resistance. The resulting composition is therefore not suitable for practical application. On the other hand, if its amount is less than 50 parts by weight, there is no significance of using the filler.

The ingredients (A) to (B) may be blended by methods usually known in the art. For example, all the ingredients are mixed by a Nauter mixer, a ribbon mixer or a Henschel mixer, and then melt-kneaded by using a kneader, an extruder or a roll. Alternatively, the ingredients (A), (B) and (D) are first melt-mixed and then the filler (E) and the curing promoter (C) are added and uniformly mixed.

Various additives may be added to the composition of this invention according to purposes and uses so long as they do not impair the objects of this invention. The additives include, for example, coloring agents such as carbon black, mold releasing agents such as fatty acid esters and carnauba wax, coupling agents such as epoxysilanes, aminosilanes and alkyl titanates, fire retardants such as antimony compounds, and cracking resistance improvers such as thermoplastic resins (e.g., polyphenylene ether resins, polysulfide resins, and polysulfone resins).

The epoxy resin composition of this invention has excellent thermal resistance, moisture resistance and low stress characteristics and is suitable for use as an encapsulating material for electrical and electronic parts, particularly large-sized semiconductor elements. Its excellent thermal low moduli and low coefficients of linear expansion contributes to low stress characteristics, and in combination with its excellent thermal resistance and moisture resistance, the epoxy resin composition of this invention provides encapsulated articles having high reliability.

The following Examples and Comparative Examples illustrates the present invention more specifically. All parts and percentages in these examples are by weight.

In the following examples, the various properties were measured by the following tests.

MECHANICAL STRENGTH

Flexural strength and modulus was measured on a test sample having a thickness of 4 mm, a width of 10 mm and a length of 100 mm in accordance with Japanese Industrial Standard (JIS) K-6911.

COEFFICIENT OF LINEAR EXPANSION

A prism-shaped sample, 3 mm square and 15 mm long, was cut out from a circular plate having a thickness of 3 mm and a diameter of 100 mm. By using a dilatometer (model DL50) made by Shinku Riko, the linear expansion of the prism-shaped sample was measured at a temperature elevation rate of 5° C./min.

GLASS TRANSITION TEMPERATURE

The temperature at which the above linear expansion bends is defined as the glass transition temperature.

WATER ABSORPTION

A circular plate sample having a thickness of 2 mm and a diameter of 100 mm was subjected to a pressure cooker test (PCT) at 130° C. and 2.7 atmospheres for 100 hours and 500 hours, respectively. The weight increase from the initial stage is defined as the water absorption.

VOLUME RESISTIVITY

The circular test sample subjected to measurement of water absorption was used and its volume resistivity was measured in accordance with JIS K-6911. The measured values were expressed in logarithms.

WEIGHT DECREASE RATE AT HIGH TEMPERATURES

The test sample of measurement of mechanical strength was used, and stored in a constant temperature vessel at 200° C. for 100 and 300 hours, and the weight decrease rate from the initial stage was measured.

EXAMPLE 1

One hundred grams of methylhydrogensilicone (FZ3702, a product of Nippon Unicar Company, Ltd.) having a hydrogen equivalent of 1100, 12.2 g of 2-allylphenol, and 5 g of a 0.1% methyl isobutyl ketone solution of hexachloroplatinic acid were reacted with stirring at 100° C. for 2 hours in a stream of nitrogen gas. The reaction product was washed with water and dehydrated to give the desired phenolic hydroxyl group-containing silicon (designated as modified silicon 1).

Then, 200 g of cresol novolak epoxy (EOCN 1020 produced by Nihon Kayaku Co., Ltc.; epoxy equivalent 200), 40 g of the modified silicon 1 and 0.4 g of triphenylphosphine (PP-360, a product of Keiai Chemical Co., Ltd. were dispersed, mixed and reacted with stirring at 150° C. for 2 hours in a nitrogen gas stream. The product was taken out, cooled and pulverized to obtain a modified epoxy (to be designated as the modified epoxy 1).

The modified epoxy 1, cresol novolak epoxy, phenol novolak epoxy, phenol novolak (PSF 4261 produced by Gun Ei Chemical Industry Co., Ltd.; hydroxy equivalent 110), brominated bisphenol A epoxy (ESB 400 produced by Sumitomo Chemical Co., Ltd.; epoxy equivalent 400), antimony trioxide, amorphous silica powder (RD-9 produced by Tatsumori), silane coupling agent (gamma-glycidoxypropyltrimethoxysilane, KBM-403, produced by Shin-etsu Chemical Co., Ltd.), triphenylphosphine, carnauba wax and carbon black were mixed by a Henschel mixer in the proportions shown in Table 1, and then kneaded by a roll at 90° to 100° C. The kneaded mixture was cooled and pulverized to form a composition.

the composition was transfer-molded at a mold temperature of 175° C. under a pressure of 70 Kg/cm$^2$ to prepare various test samples. The test samples were after-cured in a constant temperature vessel at 175° C., and then tested. The properties of the composition were as shown in Table 1.

COMPARATIVE EXAMPLE 1

Two hundred grams of cresol novolak epoxy (EOCN 1020 produced by Nihon Kayaku Co., Ltd.; epoxy equivalent 200), 40 g of amino-modified silicone (BX16-853B produced by Toray Silicone Co., Ltd.; amine equivalent 2200) and 0.4 g of triphenylphosphine (PP-360 produced by Keiai Chemical Co., Ltd.) were dispersed, mixed and reacted with stirring at 150° C. for 2 hours. The reaction product was taken out, cooled and pulverized to form a modified epoxy (to be designated as the modified epoxy 2).

The modified epoxy 2 was mixed with the ingredients shown in Table 1 in the proportions indicated by the same method as in Example 1 to form a composition. Test samples were molded from the composition, and tested as in Example 1. The results are shown in Table 1.

TABLE 1

| Run | | Example 1 | | Comparative Example 1 | |
|---|---|---|---|---|---|
| Composition No. | | 1 | 2 | 3 | 4 |
| Cresol novolak epoxy | | parts 50 | — parts | parts 50 | — |
| Modified epoxy 1 | | 60 | 120 | — | — |
| Modified epoxy 2 | | — | — | 60 | 120 |
| Phenol novolak | | 59 | 59 | 59 | 59 |
| Brominated bisphenol A epoxy | | 12 | 12 | 12 | 12 |
| Antimony trioxide | | 10 | 10 | 10 | 10 |
| Silica powder | | 569 | 600 | 569 | 600 |
| Silane coupling agent | | 5.7 | 6 | 5.7 | 6 |
| Triphenyl phosphine | | 1.3 | 1.3 | 1.3 | 1.3 |
| Carnauba wax | | 1.5 | 1.5 | 1.5 | 1.5 |
| Carbon black | | 2 | 2 | 2 | 2 |
| Flexural strength (kg/mm$^2$) | | 13.2 | 12.5 | 13.0 | 8.2 |
| Flexural modulus (kg/mm$^2$) | | 1250 | 1170 | 1200 | 900 |
| Coefficient of thermal expansion ($\times 10^5$/°C.) | | 1.80 | 1.67 | 2.18 | 2.20 |
| Glass transition temperature (°C.) | | 170 | 168 | 166 | 165 |
| Water absorption (%) | 100 hours | 0.7 | 0.7 | 0.7 | 0.7 |
| (150° C., PCT method) | 500 hours | 0.8 | 0.8 | 0.7 | 0.4[1] |
| Volume resistivity (log $\rho v$;) | 100 hours | 15.5 | 15.3 | 15.6 | 15.6 |
| (150° C., PCT method) | 500 hours | 15.4 | 15.2 | 15.5 | 15.4 |
| High temperature weight loss (%, 250° C.) | 100 hours | 0.6 | 0.7 | 1.7 | 2.1 |
| | 300 hours | 1.5 | 1.7 | 3.3 | 4.0 |

[1]This shows the occurrence of weight loss.

EXAMPLE 2

Three modified silicones were obtained by reacting various methylhydrogensilicones having both ends hydrogenated (produced by Chisso Corporation) with 2-allylphenol in the proportions shown in Table 2. Then, cresol novolak epoxy (EOCN 1020 produced by Nihon Kayaku Co., Ltd.; epoxy equivalent 200), 80 g of each of the modified silicones, and 0.1 g of 2-phenylimidazole (2PZ produced by Shikoku chemicals Corporation) were dispersed, mixed and reacted in a nitrogen gas stream with stirring at 150° C. The product was taken out, cooled and pulverized. Thus, three modified epoxy resins were obtained.

Using these modified epoxy resins, compositions were produced in the same way as in Example 1 in accordance with the formulations shown in Table 3. Test samples were molded from the compositions and tested as in Example 1. The results are shown in Table 3.

TABLE 2

| Modified silicone No. | 2 | 3 | 4 |
|---|---|---|---|
| Type of silicone | FM1111 | FM1121 | FM1125 |
| Hydrogen equivalent | 500 | 2500 | 5000 |
| Silicone | 100 g | 100 g | 100 g |
| 2-Allylphenol | 26.8 g | 5.4 g | 2.7 g |
| Catalyst solution[*1] | 5 g | 5 g | 5 g |
| Modified epoxy No. | 3 | 4 | 5 |

[*1] A 0.1% methyl isobutyl ketone solution of hexachloroplatinic acid as in Example 1.

COMPARATIVE EXAMPLE 2

Two hundred grams of cresol novolak epoxy (EOCN 1020 produced by Nihon Kayaku Co., Ltd.; epoxy equivalent 200), 40 g of carbinol-modified silicon (BX 16-007 produced by Toray Silicon Co., Ltd.; hydroxyl equivalent 2500), and 1.2 g of acetylacetone aluminum were dispersed, mixed and reacted in a stream of a nitrogen gas with stirring at 150° C. for 25 hours. The product was taken out, cooled and pulverized to obtain a modified epoxy (to be designated as the modified epoxy 6).

the modified epoxy was mixed with the other components shown in Table 3 in the proportions indicated to form a composition. Test samples were molded from the compositions and tested as in Example 1.

COMPARATIVE EXAMPLE 3

118 g of phenol novolak (PSF 4261 produced by Gun Ei Chemical Industry Co., Ltd.), 40 g of epoxy-modified silicone (BY 16-855 produced by Toray Silicone Co., Ltd.; epoxy equivalent 650) and 2.5 g of triphenylphosphine were dispersed, mixed and reacted with stirring at 150° C. for 4 hours in a nitrogen gas stream. The product was taken out, cooled and pulverized to form a modified novolak (to be designated as the modified novolak 1). A composition was produced using the modified novolak 1 in accordance with the formulation shown in Table 3 in the same way as in Example 1. Test samples were molded from the composition and tested as in Example 1. The results are shown in Table 3.

TABLE 3

| Run | Example 2 | | | Comparative Example 2 | Example 3 |
|---|---|---|---|---|---|
| Composition No. | 5 | 6 | 7 | 8 | 9 |
| Cresol novolak epoxy | — | — | — | — | 100 parts |
| Modified epoxy 3 | 140 parts | — | — | — | — |
| Modified epoxy 4 | — | 140 parts | — | — | — |
| Modified epoxy 5 | — | — | 140 parts | — | — |
| Modified epoxy 6 | — | — | — | 120 parts | — |
| Phenol novolak | 59 | 59 | 59 | 59 | — |
| Modified phenol novolak | — | — | — | — | 79 |
| Brominated bisphenol A epoxy | 12 | 12 | 12 | 12 | 12 |
| Antimony trioxide | 10 | 10 | 10 | 10 | 10 |
| Silica powder | 660 | 660 | 660 | 600 | 600 |
| Silane coupling agent | 6.6 | 6.6 | 6.6 | 6.0 | 6.0 |
| Triphenyl phosphine | 1.5 | 1.5 | 1.5 | 1.3 | 1.3 |
| Carnauba wax | 1.5 | 1.5 | 1.5 | 1.5 | 1.5 |
| Carbon black | 2 | 2 | 2 | 2 | 2 |
| Flexural strength (kg/mm$^2$) | 11.5 | 11.0 | 11.2 | 12.4 | 11.8 |
| Flexural modulus (kg/mm$^2$) | 1050 | 1080 | 1030 | 1200 | 1150 |
| Coefficient of expansion ($\times 10^5$/°C.) | 1.45 1.43 | 1.47 | 1.60 | 2.20 | |
| Glass transition temperature (°C.) | 172 | 170 | 173 | 168 | 170 |
| Water absorption (%) 100 hours (150° C., PCT method) | 0.6 | 0.6 | 0.6 | 0.8 | 0.7 |
| 500 hours | 0.7 | 0.7 | 0.7 | 1.0 | 0.5[(1)] |
| Volume resistivity (log ρv;) 100 hours (150° C., PCT method) | 15.2 | 15.4 | 15.5 | 15.0 | 15.3 |
| 500 hours | 15.1 | 15.2 | 15.4 | 14.7 | 15.1 |
| High temperature weight loss (%, 250° C.) 100 hours | 0.9 | 0.7 | 0.5 | 1.0 | 1.0 |
| 300 hours | 2.0 | 1.8 | 1.7 | 2.5 | 3.2 |

[(1)] Same as the footnote to Table 1.

EXAMPLE 3

The same silicones as used in Example 2 were reacted with 2-methoxy-4-allylphenol in accordance with the formulations shown in Table 4 in the same way as in Example 1 to give three modified silicones. Then, 200 g of cresol novolak epoxy (EOCN 1020 produced by Nihon Kayaku Co., Ltd.; epoxy equivalent 200), 40 g of each of the modified silicones, and 0.1 g of 2-phenylimidazole (2PZ produced by Shikoku Chemicals Corporation) were dispersed, mixed and reacted in a stream of nitrogen gas with stirring at 150° C. for 1 hour. The product was taken out, cooled, and pulverized to give modified epoxy resins. Compositions were prepared as in Exmaple 1 using these modified epoxy resins in accordance with the formulations shown in Table 5. Test samples were molded from the compositions and tested as in Exmaple 1. The results are shown in Table 5.

TABLE 4

| Modified silicone No. | 5 | 6 | 7 |
|---|---|---|---|
| Type of silicone | FM1111 | FM1121 | FM1125 |
| Hydrogen equivalent | 500 | 2500 | 5000 |
| Silicone | 100 g | 100 g | 100 g |
| 2-Methoxy-4-allylphenol | 32.8 g | 6.6 g | 3.3 g |
| Catalyst solution[*1] | 5 g | 5 g | 5 g |
| Modified epoxy No. | 7 | 8 | 9 |

[*1] A 0.1% methyl isobutyl ketone solution of hexachloroplatinic acid as in Example 1.

TABLE 5

| Run | Example 3 | | |
|---|---|---|---|
| Composition No. | 10 | 11 | 12 |
| Modified epoxy 7 | 120 parts | — | — |
| Modified epoxy 8 | — | 120 parts | — |
| Modified epoxy 9 | — | — | 120 parts |
| Phenol novolak | 59 | 59 | 59 |
| Brominated bisphenol A epoxy | 12 | 12 | 12 |
| Antimony trioxide | 10 | 10 | 10 |
| Silica powder | 600 | 600 | 600 |
| Silane coupling agent | 6 | 6 | 6 |
| Triphenyl phosphine | 1.3 | 1.3 | 1.3 |
| Carnauba wax | 1.5 | 1.5 | 1.5 |
| Carbon black | 2 | 2 | 2 |
| Flexural strength (kg/mm$^2$) | 11.2 | 10.9 | 10.8 |
| Flexural modulus (kg/mm$^2$) | 1150 | 1120 | 1130 |

TABLE 5-continued

| Run | | Example 3 | | |
|---|---|---|---|---|
| Composition No. | | 10 | 11 | 12 |
| Coefficient of thermal expansion ($\times 10^5/°C.$) | | 1.68 | 1.71 | 1.70 |
| Glass transition temperature (°C.) | | 167 | 169 | 166 |
| Water absorption (%) (150° C., PCT method) | 100 hours | 0.8 | 0.7 | 0.7 |
| | 500 hours | 1.0 | 0.8 | 0.8 |
| Volume resistivity (log $\rho v$;) (150° C., PCT method) | 100 hours | 15.2 | 15.4 | 15.5 |
| | 500 hours | 15.0 | 15.3 | 15.4 |
| High temperature weight loss (%, 250° C.) | 100 hours | 0.8 | 0.7 | 0.7 |
| | 300 hours | 1.9 | 1.8 | 1.6 |

COMPARATIVE EXAMPLE 4

Two hundred grams of cresol novolak epoxy (EOCN 1020 produced by Nihon Kayaku Co., Ltd.) and 80 g of each of four methylhydrogensilicones (FZ3702 product by Nippon unicar Co., Ltd. and FM 1111, FM 1121 and FM 1125 produced by Chisso Corporation) were dispersed and mixed with stirring at 150° C. in a stream of nitrogen gas. The methyhydrogensilicone oozed out from any of the resulting dispersed mixtures. Compositions were prepared from these mixtures, and test samples were molded from the compositions, in the same way as in Example 2. The silicone compound oozed out from any of the samples.

We claim:

1. An epoxy resin composition consisting essentially of:

(A) an epoxy resin, (B) a curing agent, (C) a curing promoter, (D) an organic silicon compound represented by the formula

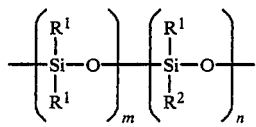

in which $R^1$'s are identical or different and each represents a hydrocarbon group selected from the class consisting of $C_1$–$C_3$ alkyl groups, $C_2$–$C_4$ alkenyl groups, $C_6$–$C_{12}$ aryl groups, $C_3$–$C_{10}$ cycloalkyl groups and $C_7$–$C_{12}$ aralkyl groups, the hydrocarbon group being optionally substituted by 1 to 6 halogen atoms;

$R^2$ represents a group of the general formula

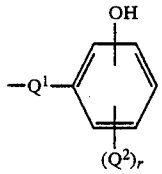

where $Q^1$ is a group of the general formula:

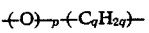

p is 0 or 1 and q is an integer of 1 to 3, with the proviso that $Q^1$ may be bonded to the benzene ring at either end, $Q^2$ represents a hydrogen atom, a halogen atom, a $C_1$–$C_3$ alkyl group, a $C_1$–$C_3$ alkoxy group, a $C_1$–$C_3$ haloalkyl group or a $C_1$–$C_3$ haloalkoxy group, and r is 1 or 2;

m and n represent the numbers of the two types of siloxane moieties contained in the organic silicon compound, and m is 0 or an integer of 1 or more, n is an integer of 1 or more, and the total of m and n is 3 to 250; and, each of the two ends is $R^1$ or $R^2$, and the type of each end group and the number represented by n are selected from the above definitions os that formula [I] contains at least one $R^2$ group, and (E) a filler.

2. The resin composition of claim 1 in which the epoxy resin (A) is an epoxy resin containing at least two epoxy groups per molecule.

3. The resin composition of claim 1 in which the epoxy resin (A) is at least one epoxy resin selected from the group consisting of products obtained by reacting an epihalohydrin with a novolak, a bisphenol or a dihydroxy biphenyl.

4. The resin composition of claim 1 in which the curing agent (B) is a novolak resin having at least two hydroxyl groups per molecule.

5. The resin composition of claim 1 in which the curing promoter (C) is at least one compound selected from the group consisting of (1) imidazoles, (2) organic phosphines, (3) amines and (4) cycloamidines.

6. The resin composition of claim 1 in which the filler (E) is at least one silica selected from the group consisting of crystalline silica or amorphous silica.

7. The resin composition of claim 1 in which the curing agent (B) is contained in such an amount that the ratio of the epoxy group equivalent of the epoxy resin (A) to the functional group equivalent of the curing agent (B) is in the range of from 0.7:1 to 1.3:1.

8. The resin composition of claim 1 in which the curing promoter (C) is contained in a proportion of 0.01 to 10 parts by weight per 100 parts by weight of the epoxy resin (A).

9. The resin composition of claim 1 in which the organic silicon compound (D) is contained in a proportion of 1 to 100 parts by weight per 100 parts by weight of the epoxy resin (A) and the curing agent (B) combined.

10. The resin composition of claim 1 in which the filler (E) is contained in a proportion of 50 to 1,000 parts by weight per 100 parts by weight of the epoxy resin (A), the curing agent (B) and the organic silicon compound (D) combined.

11. A process which comprises encapsulating an electronic or electrical part in the composition of claim 1.

* * * * *